(12) United States Patent
Ingrassia (10) Patent No.: US 9,970,477 B2
(45) Date of Patent: May 15, 2018

(54) ASSEMBLY FOR BALL AND SOCKET JOINTS

(71) Applicant: Hong Kong Baptist University, Kowloon (HK)

(72) Inventor: Andrea Ingrassia, Kowloon (HK)

(73) Assignee: Hong Kong Baptist University, Hong Kong (HK)

( * ) Notice: Subject to any disclaimer, the term of this patent is extended or adjusted under 35 U.S.C. 154(b) by 395 days.

(21) Appl. No.: 14/714,660

(22) Filed: May 18, 2015

(65) Prior Publication Data

US 2016/0341243 A1 Nov. 24, 2016

(51) Int. Cl.
| | |
|---|---|
| *G09B 19/10* | (2006.01) |
| *F16C 11/06* | (2006.01) |
| *F16M 11/14* | (2006.01) |
| *F16M 11/20* | (2006.01) |
| *F16M 11/40* | (2006.01) |
| *F16C 33/37* | (2006.01) |

(52) U.S. Cl.
CPC .......... *F16C 11/06* (2013.01); *F16C 11/0638* (2013.01); *F16M 11/14* (2013.01); *F16M 11/2078* (2013.01); *F16M 11/40* (2013.01); *F16C 33/3706* (2013.01)

(58) Field of Classification Search
CPC ...... F16C 11/0638; F16C 11/06; G09B 19/10; G09B 23/04; Y10T 403/32032; Y10T 403/32631; Y10T 403/32008; Y10T 403/32041; Y10T 403/32786; Y10T 403/32803; A63H 33/06; A63H 33/062; A63H 33/08; A63H 33/04; A63H 33/065; A63H 33/10; A63H 33/101; A63H 33/102
See application file for complete search history.

(56) References Cited

U.S. PATENT DOCUMENTS

| | | | | |
|---|---|---|---|---|
| 1,678,709 | A * | 7/1928 | Schurmann | F16C 1/04 446/104 |
| 3,490,798 | A * | 1/1970 | Spyra | F16C 11/0614 384/206 |
| 4,065,220 | A * | 12/1977 | Ruga | E04B 1/1903 403/169 |
| 5,137,486 | A * | 8/1992 | Glickman | A63H 33/101 446/124 |
| 5,908,342 | A * | 6/1999 | Wolvin | A63F 9/12 273/160 |
| 7,090,181 | B2 * | 8/2006 | Biba | F16C 11/106 248/288.31 |
| 7,318,764 | B2 * | 1/2008 | Elias | A63F 9/12 273/153 R |
| 7,326,100 | B2 * | 2/2008 | O'Brien | A63H 3/04 403/57 |
| D749,175 | S * | 2/2016 | Vaughey | D21/484 |
| 2003/0077110 | A1 * | 4/2003 | Knowles | F16L 27/04 403/56 |
| 2014/0376993 | A1 * | 12/2014 | Martinez | A63H 33/084 403/170 |

* cited by examiner

*Primary Examiner* — Michael P Ferguson
(74) *Attorney, Agent, or Firm* — Idea Intellectual Limited; Margaret A. Burke; Sam T. Yip (57) ABSTRACT

An assembly for a ball and socket joint forming a universal joint is disclosed as including a socket joint assembly comprising a first dual-ended sphere-receiving element and a second dual-ended sphere-receiving element joined together by a flush fitting joint.

10 Claims, 10 Drawing Sheets

ASSEMBLY FOR BALL AND SOCKET JOINTS

FIELD OF INVENTION

The present invention provides an assembly for a ball and socket joint wherein the elements of said ball and socket joint assembly are simple and easy to manufacture and to assemble together to form an effective universal joint, in particular wherein the socket joint assembly is comprising at least two pieces of dual ended sphere receiving elements joined together by a flush fitting joint, such as a cross half lap joint. The present invention further provides an assembly for a ball and socket joint wherein said ball and socket joint can connect one sphere to at least another sphere, up to another three spheres.

BACKGROUND OF INVENTION

Ball and socket joints are quite common but most of the joints are single piece assembly of a socket receiving a ball or a spherical plug. There are also ball and socket joints wherein the socket comprises of more than one piece, forming a socket receiving a ball or a spherical plug. Nonetheless, the ball and socket joints in the prior arts are often tailored made assemblies manufactured using specialist equipment or machining tools.

The objective of the present invention is to provide for an assembly for a ball and socket joint wherein the elements of said ball and socket joint assembly are simple and easy to manufacture and to assemble together to form an effective universal joint, especially when the socket is formed by at least two elements assembled by a simple joint and the ball comprising any suitable sphere.

Citation or identification of any reference in this section or any other section of this application shall not be construed as an admission that such reference is available as prior art for the present application.

SUMMARY OF INVENTION

The present invention provides an assembly for a ball and socket joint wherein the elements of said ball and socket joint assembly are simple and easy to manufacture and to assemble together to form an effective universal joint, in particular wherein the socket joint assembly is comprising at least two pieces of dual ended sphere receiving elements joined together by a flush fitting joint such as a cross half lap joint. The present invention further provides an assembly for a ball and socket joint wherein said ball and socket joint can connect one sphere to at least another sphere, up to another three spheres.

In a first aspect of the present invention there is provided an assembly for a ball and socket joint forming a universal joint, comprising a socket joint assembly comprising at least a first dual-ended sphere-receiving element and a second dual-ended sphere-receiving elements joined together by a flush fitting joint.

In a first embodiment of the first aspect of the present invention there is provided an assembly for a ball and socket joint forming a universal joint wherein the first dual ended sphere-receiving element comprises at least one pair of prong elements joined to a first body element, wherein said first body element of said first dual-ended sphere-receiving element comprises a first recess which can be slotted into a second recess of a second body element of said second dual-ended sphere-receiving element to form the flush fitting joint, such as a cross half lap joint In a second embodiment of the first aspect of the present invention there is provided an assembly for a ball and socket joint forming a universal joint, wherein the flush fitting joint is a cross half lap joint.

In a third embodiment of the first aspect of the present invention there is provided an assembly for a ball and socket joint forming a universal joint, wherein there are at least two protrusions adjacent the first recess of said first body element of said first dual-ended sphere-receiving element such that when said first recess is slotted into the second recess of said second body element of said second dual-ended sphere-receiving element, at least one chamfered intersection is formed at the cross half lap joint.

In a fourth embodiment of the first aspect of the present invention there is provided an assembly for a ball and socket joint forming a universal joint, wherein the at least one pair of prong elements are lined with at least one friction lining.

In a fifth embodiment of the first aspect of the present invention there is provided an assembly for a ball and socket joint forming a universal joint, wherein the at least one friction lining is fastened onto the at least one pair of prong elements.

In a sixth embodiment of the first aspect of the present invention there is provided an assembly for a ball and socket joint forming a universal joint, wherein the at least one friction lining is fastened onto the at least one pair of prong elements by a detachable fastener.

In a seventh embodiment of the first aspect of the present invention there is provided an assembly for a ball and socket joint forming a universal joint, wherein said first dual-ended sphere-receiving element comprises at least two pairs of prong elements which are co-planar with one another.

In an eighth embodiment of the first aspect of the present invention there is provided an assembly for a ball and socket joint forming a universal joint, wherein the socket joint assembly is adapted to receive spherical plugs, spheres and/or balls.

In a ninth embodiment of the first aspect of the present invention there is provided an assembly for a ball and socket joint forming a universal joint, wherein the assembly is made from material comprising metal, glass, polymer, plastic, wood, hard cardboard, latex foam and/or polystyrene foam.

In a tenth embodiment of the first aspect of the present invention there is provided an assembly for a ball and socket joint forming a universal joint, wherein the assembly is manufactured by machine moulding, tool and cutter, and/or 3-dimensional printer.

In an eleventh embodiment of the first aspect of the present invention there is provided an assembly for a ball and socket joint forming a universal joint, wherein the assembly is used in toys, premiums, arts, designs and architectures.

Those skilled in the art will appreciate that the invention described herein is susceptible to variations and modifications other than those specifically described.

The invention includes all such variation and modifications. The invention also includes all of the steps and features referred to or indicated in the specification, individually or collectively and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which.

DETAILED DESCRIPTION OF INVENTION

The present invention is not to be limited in scope by any of the specific embodiments described herein. The following embodiments are presented for exemplification only.

The present invention provides an assembly for a ball and socket joint wherein the elements of said ball and socket joint assembly are simple and easy to manufacture and to assemble together to form an effective universal joint, in particular wherein the socket joint assembly is comprising at least two pieces of dual ended sphere receiving elements joined together by a flush fitting joint such as a cross half lap joint. Spheres are detachably and rotatably received in the sphere-receiving elements. The present invention further provides an assembly for a ball and socket joint wherein said ball and socket joint can connect one sphere to at least another sphere, up to another three spheres.

Figure 1:
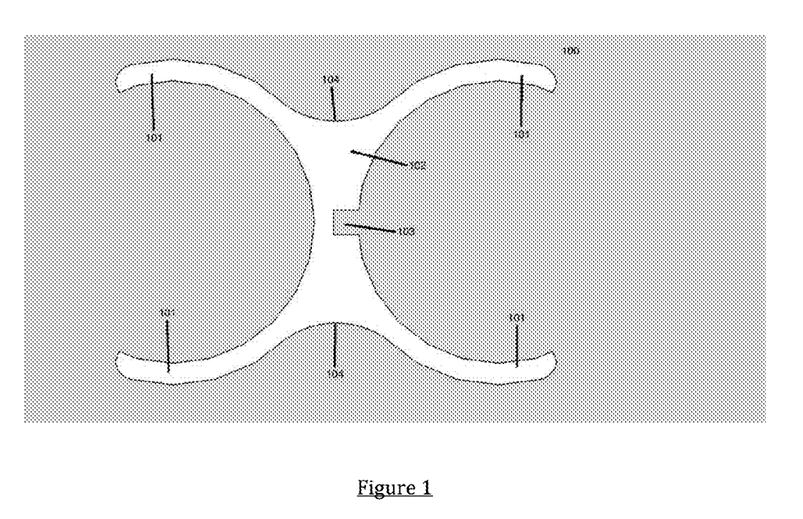
FIG. 1 shows a first embodiment of one of the dual-ended sphere-receiving element that forms the socket assembly according to the present invention.
Figure 2:
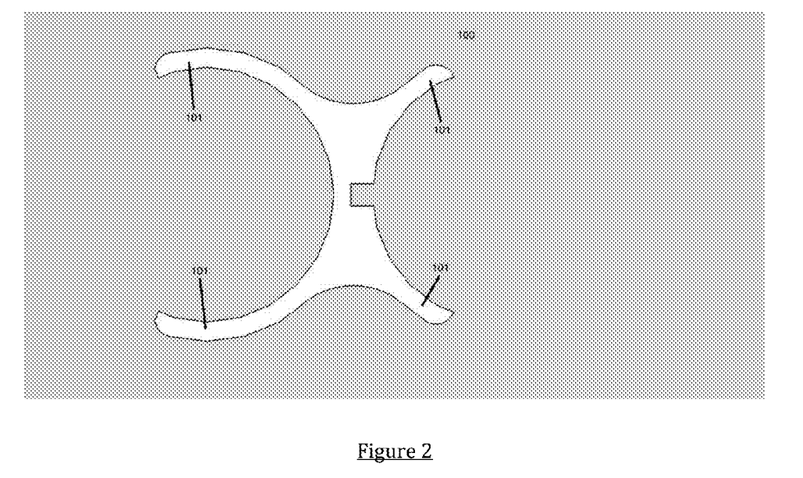
FIG. 2 shows a second embodiment of a dual-ended sphere-receiving element that forms the socket assembly according to the present invention.
Figure 3:
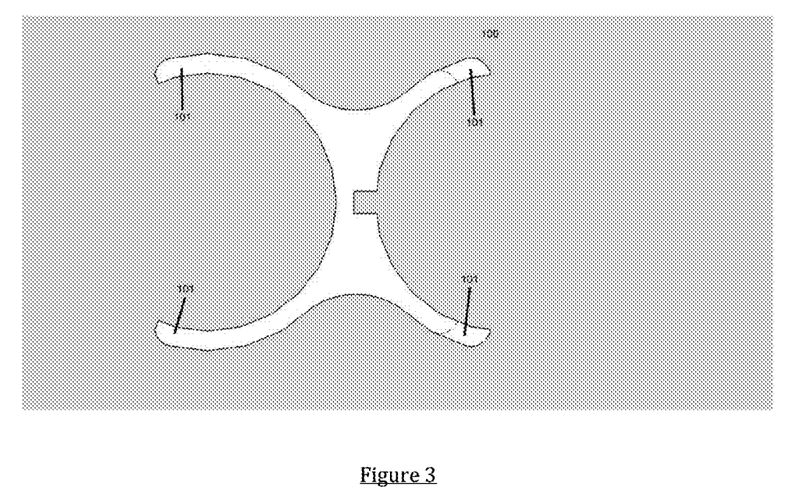
FIG. 3 shows a third embodiment of a dual-ended sphere-receiving element that forms the socket assembly according to the present invention.
Figure 4:
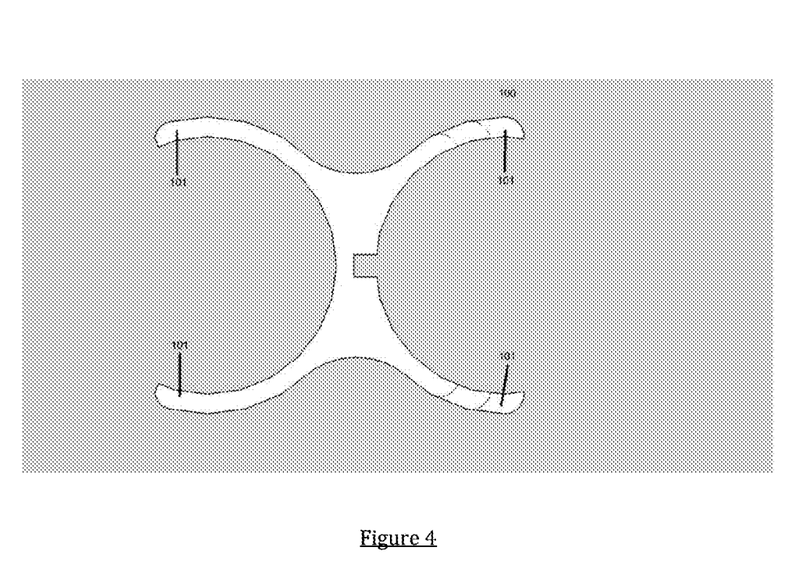
FIG. 4 shows a fourth embodiment of a dual-ended sphere-receiving element that forms the socket assembly according to the present invention.
Figure 5:
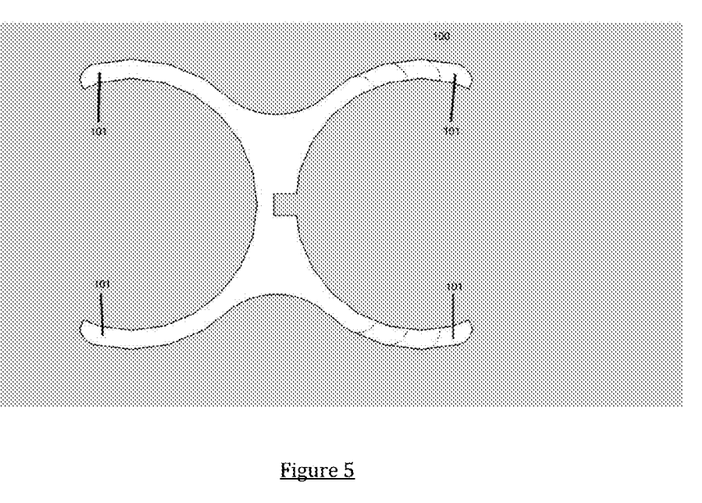
FIG. 5 shows a fifth embodiment of a dual-ended sphere-receiving element that forms the socket assembly according to the present invention.
Figure 6:
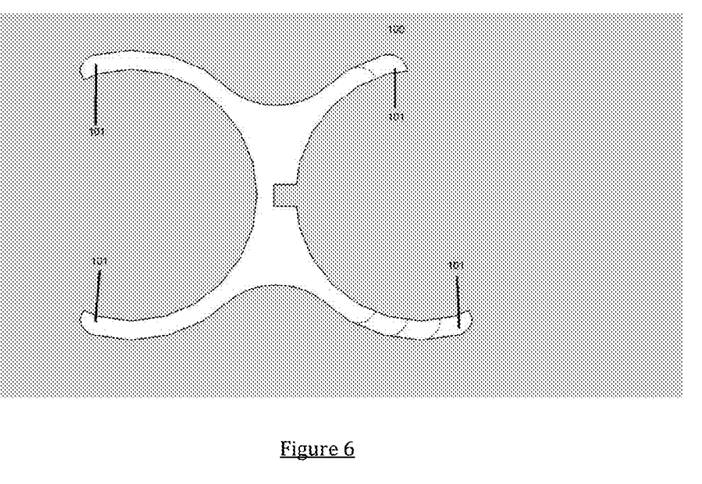
FIG. 6 shows a sixth embodiment of a dual-ended sphere-receiving element that forms the socket assembly according to the present invention.
Figure 7:
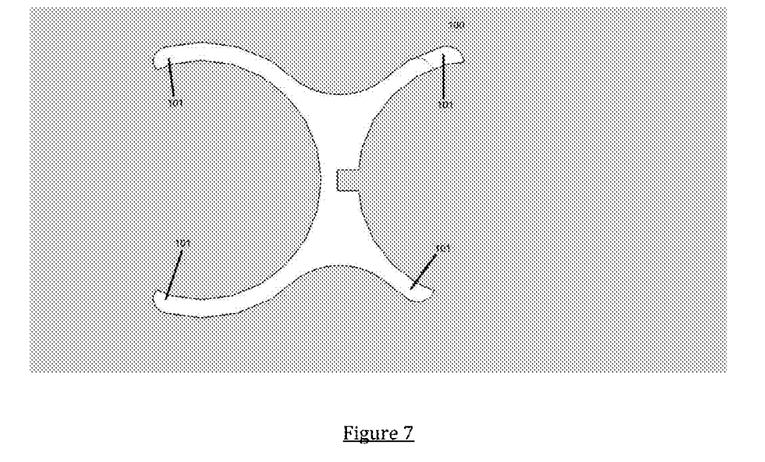
FIG. 7 shows a seventh embodiment of a dual-ended sphere-receiving element that forms the socket assembly according to the present invention.
Figure 8:
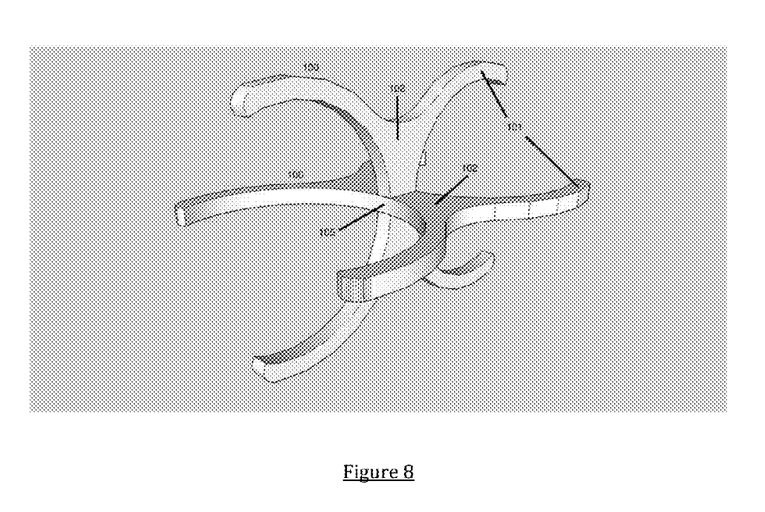
FIG. 8 shows a first embodiment of two dual-ended sphere-receiving elements joined together via a cross half lap joint to form the socket assembly.
Figure 9:
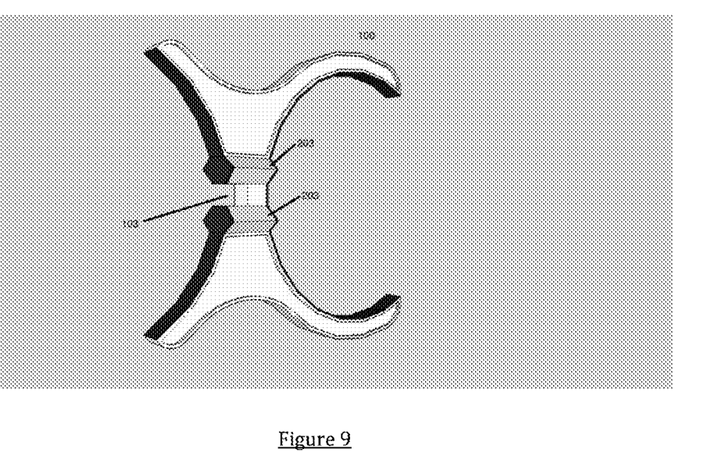
FIG. 9 shows a ninth embodiment of a dual-ended sphere-receiving element that forms the socket assembly as a 3-dimensional drawing, showing protrusions.
Figure 12:
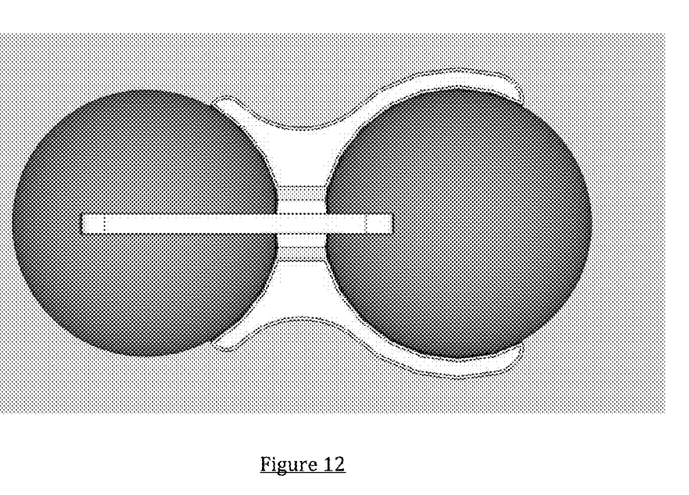
FIG. 12 shows a 3-dimensional drawing of an example of the socket assembly joining two balls.

In one embodiment of the present invention, the socket joint assembly is formed by joining two pieces of dual-ended sphere-receiving elements 100 as shown in FIG. 1. Each piece of dual-ended sphere-receiving element 100 is formed by two pairs of generally C-shaped prong elements 101 at each opposing end joined by a body element 102 wherein there is a recess 103 in the body element. The recess may be in the form of a notch configured to accept a similar notch 103 from another body element. When the two body elements are notched together, each body element is approximately perpendicular to the other body element as clearly seen in FIG. 8. The two pairs of prong elements 101 are co-planar with one another. In one variation of the present embodiment, the body element 102 is reduced at the joining section between the opposing pairs of prong elements 101 forming concaves 104 in FIG. 1. Other embodiments of the present invention include prong elements 101 of different lengths for the dual-ended sphere-receiving element 100 as shown in FIGS. 2 to 7. As seen in FIGS. 2, 3, and 9, the prong elements 101 on one side of the sphere-receiving element may be longer that the prong elements 101 on the opposite site of the sphere-receiving element. In particular, as seen in FIGS. 2 and 3, the prong elements 101 on the left side of the sphere-receiving element cover a portion of a surface of a sphere at an angle greater than 180° (see also, for example, FIG. 12 where a sphere is held by a prong element 101). In contrast, the prong elements 101 on the right side of FIGS. 2 and 3 cover a portion of a surface of a sphere at an angle less than 180° (shown also in FIG. 12). In this manner, when a pair of prong elements 101 from two different sphere-receiving elements 100 grip a sphere, as, for example, shown in FIG. 12, a pair of prong elements of greater than 180° may be employed with a pair of prong elements of less than 180° on an individual sphere. Further, each prong 101 on a side of a sphere-receiving element may be a different length than the other prong 101 that forms the prong pair. This is clearly illustrated in FIG. 6. In FIG. 6, each member of the pair of prongs 101 on the right side of element 100 is a different length. One prong extends greater than 180° while one prong extends less than 180°.

In another embodiment of the present invention, two pieces of dual-ended sphere-receiving elements 100 are joined together by slotting the recess 103 in one dual-ended sphere-receiving element 100 into the recess 103 of the other dual-ended sphere-receiving element 100 to form a cross half lap joint 105 such that at each end of the joined dual-ended sphere-receiving element 100 socket assembly a four-pronged elements substantially spherical socket is formed in which one dual-ended sphere-receiving element 100 is positioned approximately perpendicular to the other dual-ended sphere-receiving element. Thus one pair of prongs 101 is positioned approximately perpendicular to another pair of prongs 101 as it grips a sphere. One embodiment of this is shown in FIG. 8. Each four-pronged elements substantially spherical socket is to detachably and rotatably receive a spherical plug or a sphere or a ball to form a ball and socket joint.

Figure 10A:
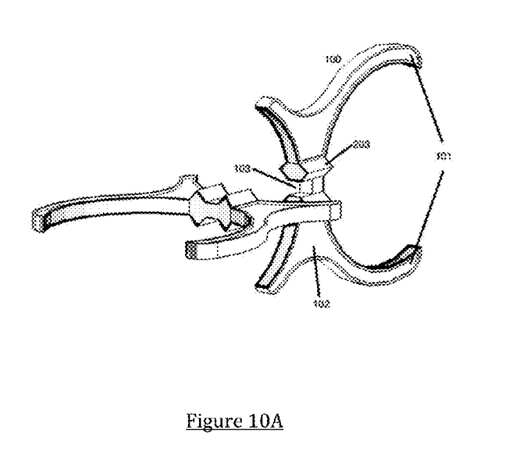
FIG. 10A shows a 3-dimensional drawing illustrating the slotting together of first and second dual-ended sphere-receiving elements. For clarity, only one of the two identical dual-ended sphere-receiving elements is labelled.
Figure 10B:
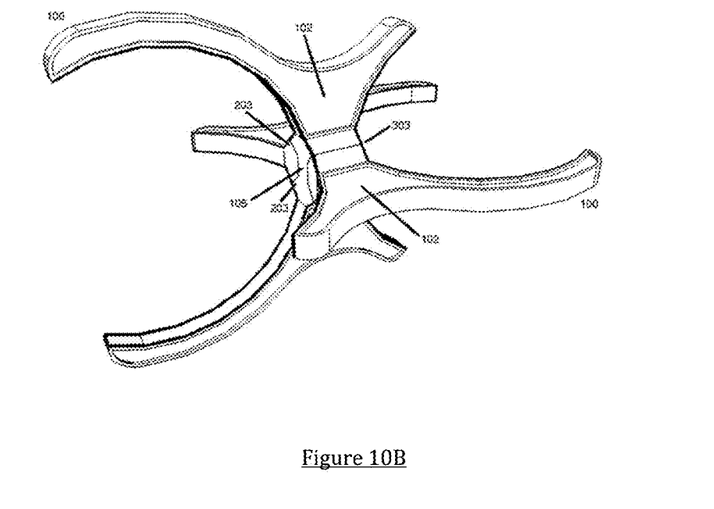
FIG. 10B shows a 3-dimensional drawing of an assembled four-pronged elements socket with chamfered intersections at the cross half lap joint.
Figure 10C:
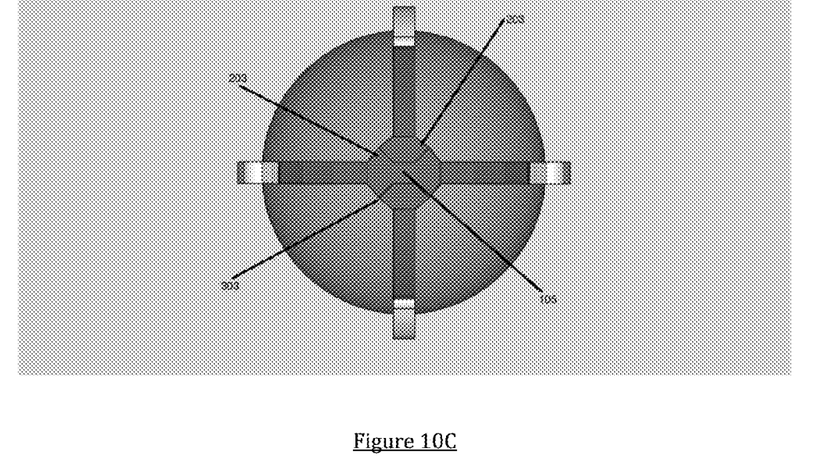
FIG. 10C shows the view from one end when an assembled four-pronged elements socket with chamfered intersections at the cross half lap joint has received one ball at the opposite end.

In another embodiment of the present invention, there is provided two protrusions 203 on either side of the recess 103 of the element 100 as shown in FIG. 9. As seen in FIG. 9, the protrusions 203 have an approximately hexagonal cross-section. These protrusions 203 on the body element 102 of a first dual-ended sphere-receiving element 100 will be aligned with the protrusions 203 on the body element 102 of a second dual-ended sphere-receiving element 100 to form a chamfered intersection 303 when the first and the second dual-ended sphere-receiving elements 100 are joined together via the cross half lap joint 105 by slotting into each other the recesses 103 in the first and the second dual-ended sphere-receiving elements 100, respectively. This is shown in FIG. 10A, FIG. 10B and FIG. 10C. The chamfered intersection will further strengthen the cross half lap joint against side motions or twisting forces.

Figure 11:
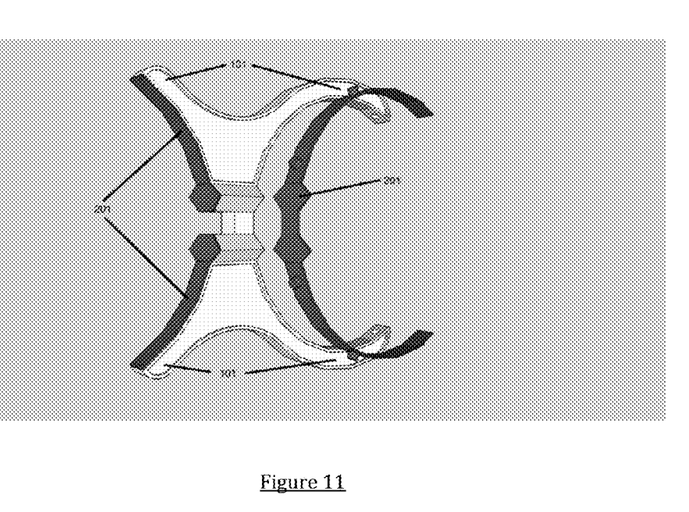
FIG. 11 shows a 3-dimensional drawing of one dual-ended sphere-receiving element that forms the socket assembly with friction linings.

In yet another embodiment of the present invention, there is provided at least one friction lining 201 in the inner surface of the pair of prong elements 101, as shown in FIG. 11. The friction lining 201 will further hold the spherical plug or sphere or ball in the socket assembly and helps to prevent slippage. The friction lining 201 can be attached onto the prong elements 101 by varied fastening means including, but not limited to, such detachable fastener as tack, Velcro, adhesive, plug and socket, etc. The friction lining 201 can also be machined onto the prong elements 101.

Figure 13A:
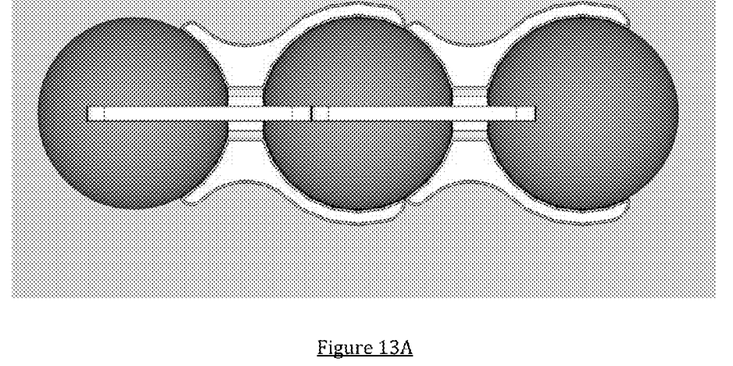
FIGS. 13A, 13B and 13C each shows a 3-dimensional example of the socket assembly joining three balls.
Figure 13B:
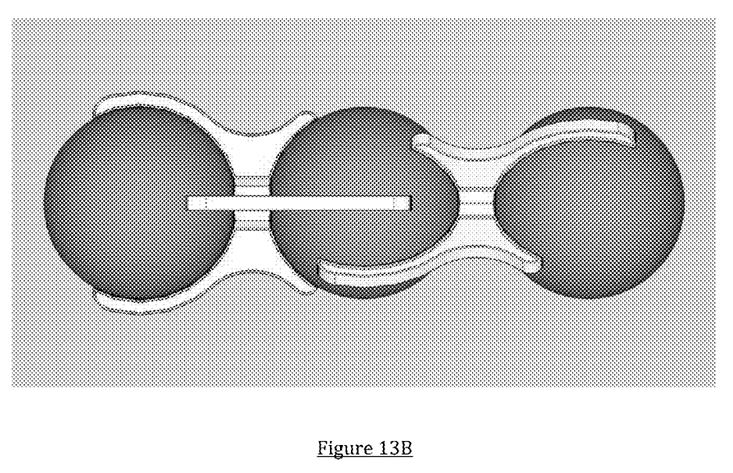
Figure 13C:
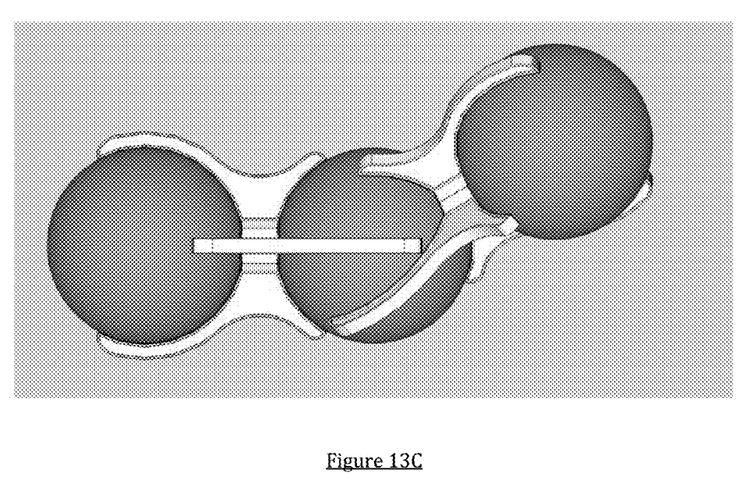
Figure 14A:
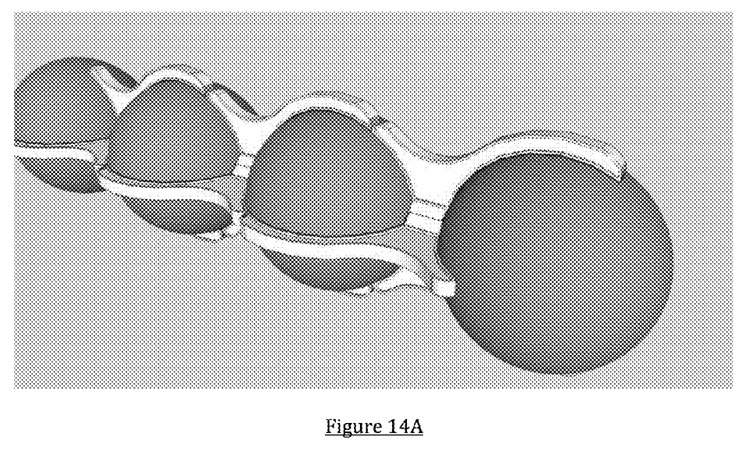
FIGS. 14A, 14B and 14C each shows a 3-dimensional example of the socket assembly joining four balls.
Figure 14B:
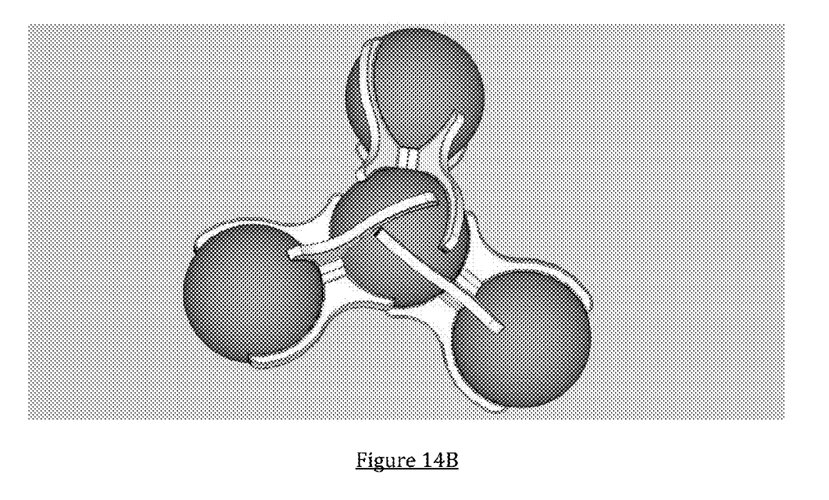
Figure 14C:
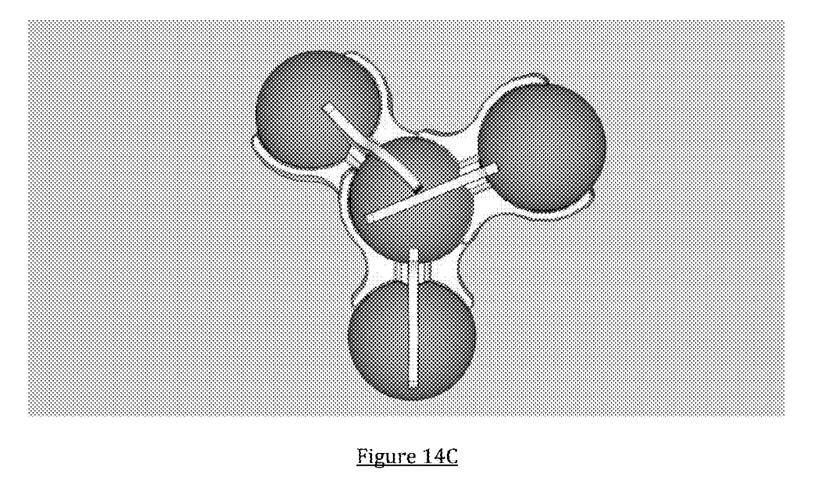

In yet another embodiment of the present invention, the assembly for a ball and socket joint can join two spherical plugs or spheres or balls. Such an example is given in FIG. 12. As will be appreciated by inspection of the FIGS., the prong elements 101 are resiliently deformable in order to accept the spheres therein. In a further embodiment of the present invention, the assembly for a ball and socket joint can join three spherical plugs or spheres or balls. Such examples are given in FIGS. 13A, 13B and 13C. In a yet further embodiment of the present invention, the assembly for a ball and socket joint can join four spherical plugs or spheres or balls. Such examples are given in FIGS. 14A, 14A and 14C.

In other embodiment of the present invention, the assembly for a ball and socket joint is made out of metal, glass, polymer or plastic. Other materials such as wood, hard cardboard, latex foam and polystyrene foam can also be used. Furthermore, the assembly for a ball and socket joint can be manufacturer by machine moulding, tool and cutter, or even be printed off a 3-dimensional printer.

In further other embodiments of the present invention, the assembly for a ball and socket joint is used as toys and premiums. Other uses for the assembly for a ball and socket joint are found in designs, arts and architectures.

If desired, the different functions discussed herein may be performed in a different order and/or concurrently with each other. Furthermore, if desired, one or more of the above-described functions may be optional or may be combined.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extent. All publications recited herein are hereby incorporated by reference in their entirety.

In a first aspect of the present invention there is provided an assembly for a ball and socket joint forming a universal joint, comprising a socket joint assembly comprising at least a first dual-ended sphere-receiving element and a second dual-ended sphere receiving elements joined together by a flush fitting joint.

In a first embodiment of the first aspect of the present invention there is provided an assembly for a ball and socket joint forming a universal joint wherein the first dual-ended sphere-receiving element comprises at least one pair of prong elements joined to a first body element, wherein said first body element of said first dual-ended sphere-receiving element comprises a first recess which can be slotted into a second recess of a second body element of said second dual-ended sphere-receiving element to form the flush fitting joint, such as a cross half lap joint.

In a second embodiment of the first aspect of the present invention there is provided an assembly for a ball and socket joint forming a universal joint, wherein the flush fitting joint is a cross half lap joint.

In a third embodiment of the first aspect of the present invention there is provided an assembly for a ball and socket joint forming a universal joint, wherein there are at least two protrusions adjacent the first recess of said first body element of said first dual-ended sphere-receiving element such that when said first recess is slotted into the second recess of said second body element of said second dual-ended sphere-receiving element, at least one chamfered intersection is formed at the cross half lap joint.

In a fourth embodiment of the first aspect of the present invention there is provided an assembly for a ball and socket joint forming a universal joint, wherein the at least one pair of prong elements are lined with at least one friction lining.

In a fifth embodiment of the first aspect of the present invention there is provided an assembly for a ball and socket joint forming a universal joint, wherein the at least one friction lining is fastened onto the at least one pair of prong elements.

In a sixth embodiment of the first aspect of the present invention there is provided an assembly for a ball and socket joint forming a universal joint, wherein the at least one friction lining is fastened onto the at least one pair of prong elements by a detachable fastener.

In a seventh embodiment of the first aspect of the present invention there is provided an assembly for a ball and socket joint forming a universal joint, wherein said first dual-ended sphere-receiving element comprises at least two pairs of prong elements which are co-planar with one another.

In an eighth embodiment of the first aspect of the present invention there is provided an assembly for a ball and socket joint forming a universal joint, wherein the socket joint assembly is adapted to receive spherical plugs, spheres and/or balls.

In a ninth embodiment of the first aspect of the present invention there is provided an assembly for a ball and socket joint forming a universal joint, wherein the assembly is made from material comprising metal, glass, polymer, plastic, wood, hard cardboard, latex foam and/or polystyrene foam.

In a tenth embodiment of the first aspect of the present invention there is provided an assembly for a ball and socket joint forming a universal joint, wherein the assembly is manufactured by machine moulding, tool and cutter, and/or 3-dimensional printer.

In an eleventh embodiment of the first aspect of the present invention there is provided an assembly for a ball and socket joint forming a universal joint, wherein the assembly is used in toys, premiums, arts, designs and architectures.

INDUSTRIAL APPLICABILITY

The present invention discloses an assembly for a ball and socket joint wherein the elements of said ball and socket joint assembly are simple and easy to manufacture and to assemble together to form an effective universal joint, in particular wherein the socket joint assembly is comprising at least two pieces of dual ended sphere receiving elements joined together by a flush fitting joint such as a cross half lap joint. The present invention further provides an assembly for a ball and socket joint wherein said ball and socket joint can connect one sphere to at least another sphere, up to another three spheres.

The invention claimed is:
1. A universal joint comprising:
   a first planar body having a first end with first and second resiliently-deformable arcuate prongs forming a substantially C-shaped sphere-receiving structure and having a second end with third and fourth resiliently-deformable arcuate prongs forming a substantially C-shaped sphere-receiving structure, the first, second, third, and fourth prongs being substantially co-planar with the first body, a central portion of the first body including a first notch and at least one pair of of the first and second prongs, and the third and fourth prongs circumferentially extending an angle greater than 180° for detachably gripping a sphere;
   a second planar body having a first end with fifth and sixth resiliently-deformable arcuate prongs forming a substantially C-shaped sphere-receiving structure and having a second end with seventh and eighth resiliently-deformable arcuate prongs forming a substantially C-shaped sphere-receiving structure, the fifth, sixth, seventh, and eighth prongs being substantially co-planar with the second body a central portion of the second body including a second notch configured to receive the first notch of the first body and at least one pair of the fifth and sixth prongs, and the seventh and eighth prongs circumferentially extending an angle greater than 180° for detachably gripping a sphere;
   the first body first notch being received in the second body second notch such that the first body and the first, second, third, and fourth prongs are substantially perpendicular to the second body and the fifth, sixth, seventh, and eighth prongs, and such that the first and second prongs and the fifth and sixth prongs form a first substantially spherical socket, and the third and fourth prongs and the seventh and eighth prongs form a second substantially spherical socket;
   a first sphere detachably retained by the first and second prongs of the first end of the first body and by the fifth and sixth prongs of the first end of the second body such that the first sphere is retained by four prongs with at least two of the four prongs extending at an angle greater than 180°; and
   a second sphere detachably retained by the third and fourth prongs of the second end of the first body and by the seventh and eighth prongs of the second end of the second body such that the second sphere is retained by four prongs with at least two of the four prongs circumferentially extending at an angle greater than 180°.

2. The universal joint of claim 1, wherein one pair of the first and second prongs, and the third and fourth prongs circumferentially extends an angle less than 180° for detachably gripping a sphere.

3. The universal joint of claim 1, wherein one pair of the fifth and sixth prongs, and the seventh and eighth prongs circumferentially extends at an angle less than 180° for detachably gripping a sphere.

4. The universal joint of claim 1, further comprising at least two protrusions adjacent the first notch of the first body and at least two protrusions adjacent the second notch of the second body, such that a chamfered intersection is formed when the first notch is received in the second notch.

5. The universal joint of claim 1, wherein at least two prongs are lined with at least one friction lining.

6. The universal joint of claim 5, wherein the at least one friction lining is fastened onto the at least two prongs.

7. The universal joint of claim 6, wherein the at least one friction lining is fastened onto the at least two prongs by a detachable fastener.

8. The universal joint of claim 1, wherein the universal joint is made from material comprising metal, glass, polymer, plastic, wood, hard cardboard, latex foam and/or polystyrene foam.

9. The universal joint of claim 1, wherein the joint is manufactured by machine molding, a tool and cutter, and/or a 3-dimensional printer.

10. A toy, art design or architectural element comprising the universal joint of claim 1.

* * * * *